United States Patent [19]

Buchan

[11] Patent Number: 5,055,183
[45] Date of Patent: Oct. 8, 1991

[54] WATER TREATMENT DEVICE

[75] Inventor: Leon Buchan, Johannesburg, South Africa

[73] Assignee: Control Chemicals (Proprietary) Limited

[21] Appl. No.: 517,676

[22] Filed: Apr. 30, 1990

[30] Foreign Application Priority Data

Apr. 28, 1989 [ZA] South Africa ............ 89/3198

[51] Int. Cl.⁵ .............................. B01D 11/02
[52] U.S. Cl. .................. 210/085; 210/86; 210/169; 210/205; 210/242.1; 422/28; 422/37; 422/265; 4/222
[58] Field of Search ............ 210/85, 86, 756, 169, 210/205, 242.1; 422/28, 37, 61, 264, 265, 905; 4/223, 228, 231, 490, 222

[56] References Cited

U.S. PATENT DOCUMENTS

| | | | |
|---|---|---|---|
| 4,241,025 | 12/1980 | Grayson, IV et al. | 422/265 |
| 4,763,685 | 8/1988 | King, Sr. | 422/265 |
| 4,917,868 | 4/1990 | Alexander et al. | 210/242.1 |

Primary Examiner—Robert A. Dawson
Assistant Examiner—David Reifsnyder
Attorney, Agent, or Firm—Arnold, Shite & Durkee

[57] ABSTRACT

A water treatment device includes a buoyant body having a sleeve portion within which a holder containing a water treatment substance is housed. The sleeve portion and the holder each have holes therethrough to permit the flow of water therethrough. The sleeve portion and holder are arranged to regulate the flow of water through the holes such that quiescent conditions prevail inside the holder. This allows a rapidly dissolving water treatment substance such as calcium hypochlorite to be used.

20 Claims, 3 Drawing Sheets

000

WATER TREATMENT DEVICE

FIELD OF THE INVENTION

This invention relates to a water treatment device It also relates to a cartridge for a water treatment device To maintain the quality of the water in a swimming pool, a water soluble chemical, typically a chemical which releases chlorine or a chlorine-containing compound into the pool water, is added to the pool water to kill bacteria and retard the growth of algae. The water soluble chemical can be dispensed into the pool water in many ways. One such way is by the dissolution of tablets contained within water treatment devices which float in the pool. The chemicals most widely used are trichloroisocyanurates and calcium hypochlorite.

Tablets of trichloroisocyanurates can last for up to two weeks and have the advantage that they leave no residue after dissolving.

Tablets of calcium hypochlorite have the substantial advantage that they are relatively inexpensive. However, they have the disadvantage that when used with water treatment devices of which the Applicant is aware they dissolve rapidly, i.e. within a matter of days. In addition, after dissolving they leave a residue which can accumulate on the pool floor with undesirable consequences such as alkalinity leach. Consequently, calcium hypochlorite is used mainly for infrequent shock treatment.

It is an object of this invention to provide means which the Applicant believes will at least alleviate these problems.

SUMMARY OF THE INVENTION

According to a first aspect of the invention there is provided a water treatment device which includes a buoyant body having a chamber-defining portion defining an enclosed chamber, as well as at least one primary aperture in the chamber-defining portion and arranged such that, when the body floats in water, water can pass through the primary aperture into the chamber, and vice versa;

a holder within the chamber, the holder defining a water treatment substance holding zone for holding a water soluble water treatment substance, and being spaced from the chamber-defining portion of the body such that water can pass along the space between the chamber-defining portion of the body and the holder; and at least one secondary aperture in the holder such that water can pass from the space between the chamber-defining portion of the body and the holder, into the holder via the secondary aperture, and vice versa.

Thus, in use, a water soluble water treatment substance or chemical, such as tablets of calcium hypochlorite, will be held within the holder. The device can then float in water, eg that of a swimming pool which is to be chlorinated, with the chamber-defining portion protruding into the water. Water will enter the holder via the primary aperture, the space between the holder and the chamber-defining portion of the body and the secondary aperture, dissolve some of the water treatment substance inside the holder, and exit the device via the secondary aperture, said space, and the primary aperture, thereby to chlorinate the water.

The body may comprise a hollow bulbous portion, with the chamber-defining portion protruding down from the bulbous portion such that the inside of the bulbous portion is in communication with the chamber. In particular the bulbous portion may comprise a relatively large diameter cylindrical sleeve ("the large sleeve") and an end piece ("the first end piece") closing off one end of the sleeve, with the chamber-defining portion comprising a smaller diameter cylindrical sleeve ("the small sleeve") connected to the other end of the large sleeve by means of an annular connecting portion, and the free end of the small sleeve also being closed off with an end piece or cap ("the second-end piece").

The holder may comprise an inner sleeve, an end piece closing off the operatively upper end of the inner sleeve, and water treatment substance support means in proximity to its other end, with the inner sleeve arranged such that its free end is closed off to prevent water from entering the operatively lower end of the inner sleeve.

The inner sleeve may be arranged such that it seals off against the small sleeve and/or the second end piece to prevent water entering the operatively lower end of the inner sleeve.

The support means may be adapted to support a water treatment substance, especially one in the form of tablets, with clearance from the operatively lower end of the inner sleeve, such that insoluble matter in the tablets can pass to the operatively lower end of the inner sleeve. Hence, when the lower end of the inner sleeve is closed off by the second end piece the insoluble matter can pass to the bottom of the small sleeve.

The water treatment device may include a water treatment substance within the holder, with the holder and water treatment substance together constituting a cartridge for the device. The substance may particularly be in the form of tablets, with the tablets being located one above the other on the support means.

The tablets or pills may comprise or contain a chlorine releasing substance, especially a fast-dissolving chlorine releasing substance such as calcium hypochlorite. In one embodiment of the invention, the tablets may be those described in South African Patent No. 77/0938 and which comprise calcium hypochlorite and chloride of lime.

The secondary aperture may be located at about the level of the tablet resting on the support means. If desired, a plurality of the secondary apertures, spaced apart circumferentially about the inner sleeve, may be provided.

A further primary aperture, spaced diametrically opposite the first primary aperture may be provided, to facilitate chlorine dispersion. At least one additional primary aperture, spaced circumferentially from the first primary aperture at about the same level thereof, may be provided, with a further primary aperture, spaced diametrically apart from the additional primary aperture, then also being provided. Hence, a plurality of diametrically opposed groups of primary apertures may be provided, each group comprising a plurality of primary apertures with at least one of the apertures in each group being of a different size to the other apertures. The diametrically spaced primary apertures may be of the same size. One or more of the apertures in each group of primary apertures can be covered up in use, depending on the pool size. The primary apertures, may be covered by nodules or nipples protruding from the small sleeve. In use, the appropriate nodule(s) for a particular size swimming pool are then detached from the sleeve so as to provide a primary aperture in the small sleeve in the zone of attachment of the nodule. Hence, the larger the pool size, the greater the primary aperture area required to achieve a desired chlorine dosage rate. The total primary aperture area may be less than the total secondary aperture area.

In a preferred embodiment of the invention the primary apertures in each group are spaced circumferentially around the small sleeve. The primary apertures in each group may be spaced longitudinally along the small sleeve or spaced both longitudinally and circumferentially.

The device may include signalling means for signalling when the water treatment substance has been consumed. The signalling means may include at least one tertiary aperture in the small sleeve, in proximity to its junction with the annular connecting portion, the size and location of the tertiary aperture being such that when all of the water treatment substance has been consumed, water enters the large sleeve causing the device to tilt at an angle, thereby indicating to a user that the device is no longer functioning to release chlorine.

The small sleeve may be provided with cartridge locating means, with complementary cartridge locating means being provided on the inner sleeve so that when the locating means engage each other, the operatively lower end of the inner sleeve fits snugly against the second end piece to close off the lower end of the inner sleeve.

At least one water baffle may be positioned in the space between the inner sleeve and the small sleeve.

According to a second aspect of the invention there is provided a water treatment device, which includes an outer sleeve defining an enclosed chamber, with at least one primary aperture in the sleeve arranged such that when the outer sleeve floats in water, water can enter and leave the chamber through the primary aperture;

an inner sleeve within the chamber, the inner sleeve defining a water treatment substance holding zone for holding a water soluble water treatment substance, and being spaced from the outer sleeve such that water can pass along the space between the outer and inner sleeves;

at least one secondary aperture in the inner sleeve such that water can pass from the space between the sleeves, into the inner sleeve via the secondary aperture, and vice versa; and buoyancy means adapted to render the device buoyant in water.

The buoyancy means may, in one embodiment of the invention, be integral with the outer sleeve. In particular, it may be in the form of a hollow bulbous portion as hereinbefore described, with the outer sleeve then being in the form of a chamber-defining portion protruding from the bulbous portion, as also hereinbefore described. The inner sleeve may then be part of the holder as hereinbefore described.

In another embodiment of the invention, the buoyancy means may be of annular form, with the outer sleeve being releasably mountable thereto, e.g. by means of complementary screw thread formations on the buoyancy means and the outer sleeve.

The invention extends also to a cartridge as hereinbefore described.

Hence, according to a third aspect of the invention there is provided a cartridge for a water treatment device which includes a holder which is mountable to a buoyant body;

a plurality of tablets of water treatment substance stacked one on top of the other in the holder; and support means supporting the tablets clear of a catch zone which in use is below the tablets.

An aperture may extend through the holder at about the level of the tablet which in use rests on the support means.

The cartridge will typically be releasably mountable to the buoyant body to facilitate replacement thereof when the water treatment substance has been consumed.

BRIEF DESCRIPTION OF THE DRAWINGS

The invention will now be described by way of example with reference to the accompanying drawings.

In the drawings.

DESCRIPTION OF THE PREFERRED EMBODIMENT

Figure 1:
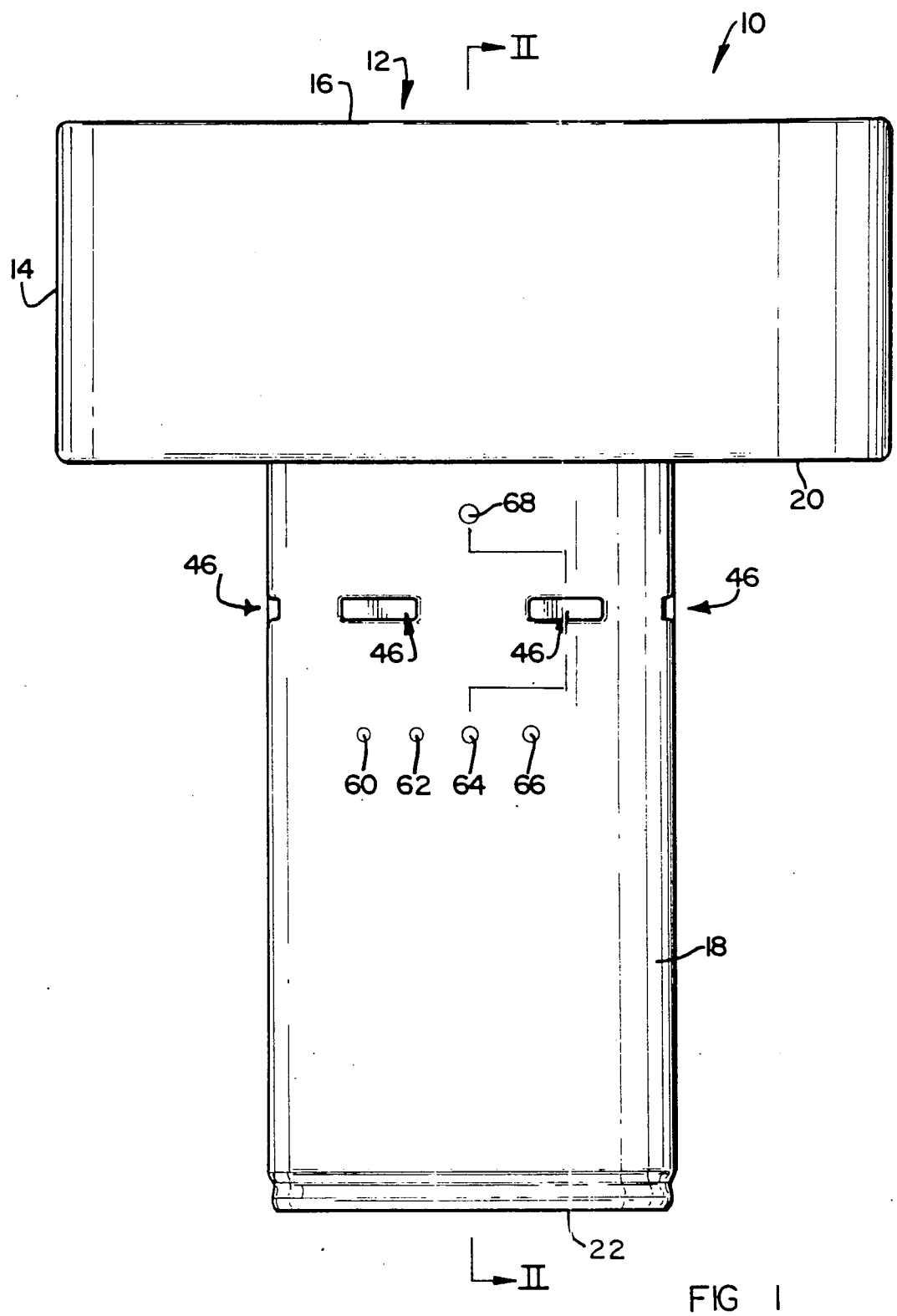
FIG. 1 shows a side view of a water treatment device, according to the invention.
Figure 2:
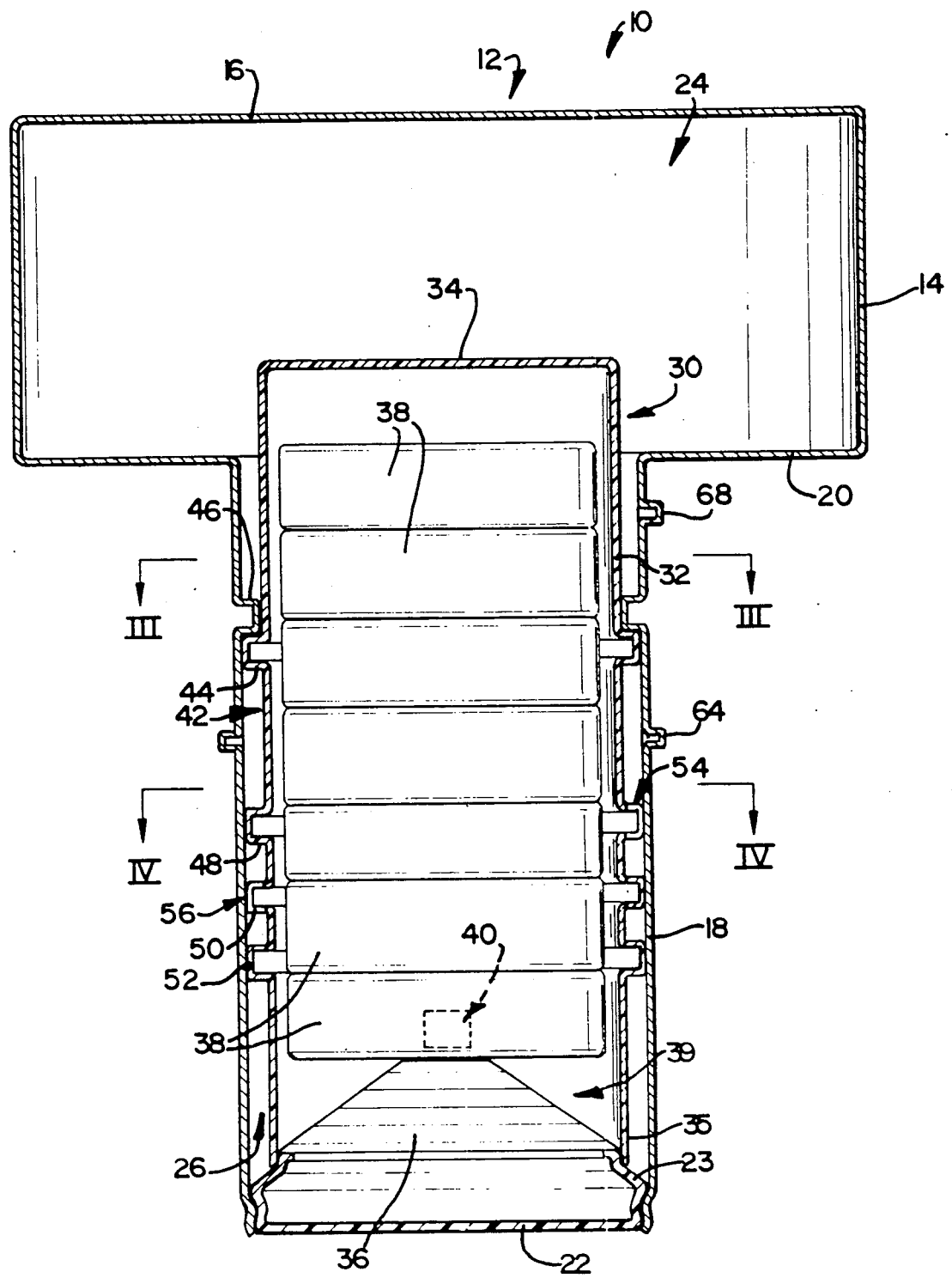
FIG. 2 shows a longitudinal sectional view through II—II in FIG. 1.
Figure 3:
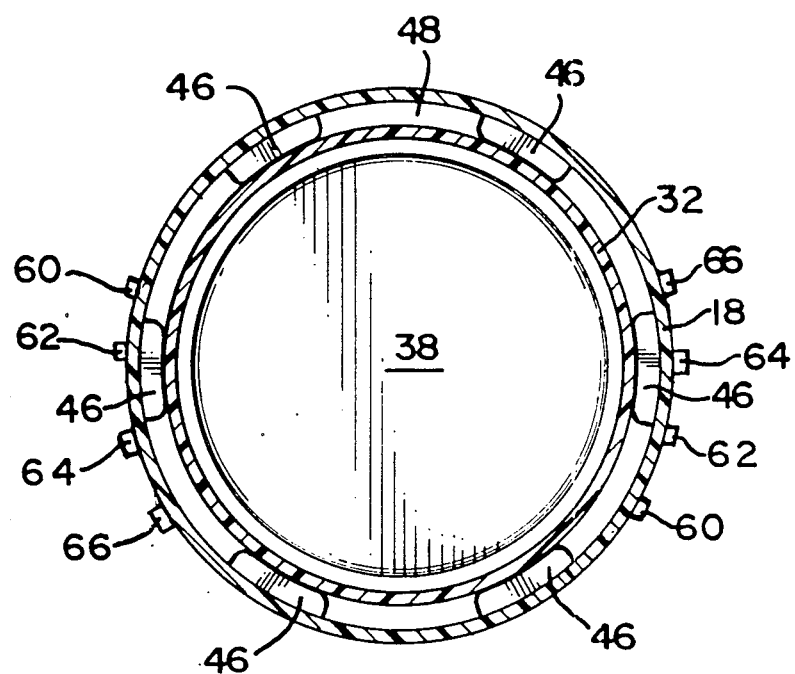
FIG. 3 shows a sectional view through III—III in FIG. 2.

In the drawings, reference numeral 10 generally indicates a water treatment device according to the invention.

The device 10 includes a buoyant body, generally indicated by reference numeral 12. The buoyant body 12 comprises a relatively large diameter cylindrical sleeve 14, the one end of which is closed off with a disc-like end piece 16. The body 12 also comprises a smaller diameter cylindrical sleeve 18, located co-axially with respect to the sleeve 14 and the one end of which is connected to the other end of the sleeve 14 by means of an annular connecting piece 20. The free end of the sleeve 18 is closed off by means of an end piece or cap 22.

The sleeve 14 hence defines a chamber 24, while the sleeve 18 defines a chamber 26.

The device 10 also includes a cartridge 30, located within the chamber 26. The cartridge 30 comprises a cylindrical sleeve 32, with an end piece 34 closing off the operatively upper end of the sleeve 32. At its operatively lower end, the sleeve 32 is provided with tablet support means in the form of a conical foraminous grid 36, on top of which rest tablets 38 of rapid dissolving chlorine releasing water treatment substance, eg calcium hypochlorite based tablets. The bottommost tablet 38 naturally rests on top of the grid 36 itself, and the grid 36 hence serves to space the bottommost tablet 38 from the lower end 35 of the sleeve 32 and the end cap 22 thereby to form a catch zone 39 below the tablets 38 for receiving solid residue.

Typically the cartridge 30 is removably mounted within the sleeve 18 to permit its removal from the sleeve when all of the tablets have been consumed. The cartridge can then be replaced with a fresh cartridge or it can be recharged with fresh tablets and inserted into the sleeve 18.

An aperture 40 is provided in the sleeve 32, at the level of the lowermost tablet 38. The aperture 40 is of a relatively large size to avoid blockage thereof by solid residue from the tablets 38.

The diameter of the sleeve 32 is smaller than that of the sleeve 18, so that there is an annular space 42 between the sleeves 18, 32.

A plurality of circumferentially spaced locating formations 44 protrude radially outwardly from the sleeve 32 into the space 42, while an equivalent number of complementary circumferentially spaced locating formations 46 protrude radially inwardly from the sleeve 18 into the space 42. The locating formations 44 hence engage or abut against the locating formations 46, thereby to ensure that the lower end 35 of the sleeve 32 abuts snugly or sealingly against a peripheral skirt 23 protruding upwardly as well as radially inwardly from the end cap 22.

Figure 4:
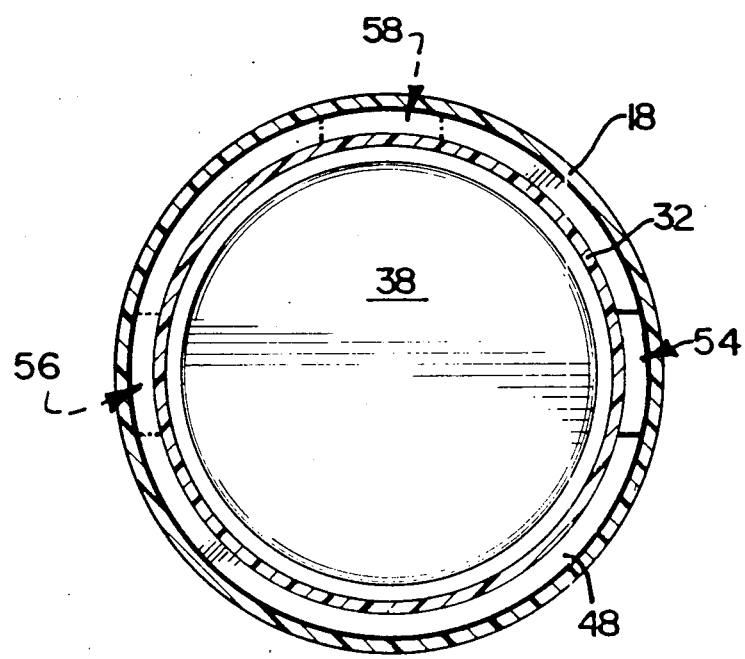
FIG. 4 shows a sectional view through IV—IV in FIG. 2.

A plurality of circumferentially extending, axially spaced, baffles 48, 50 and 52 protrude radially from the sleeve 32 and fit snugly within the sleeve 18. The baffle 48 is provided with a gap 54 through which water can pass. Likewise, the baffle 50 is provided with a similar gap 56, and the baffle 52 with a similar gap 58. The gaps 54, 56 and 58 are staggered with respect to each other when the device is seen end on, as shown in FIG. 4, thereby to provide a convoluted water flow path along the space 42. Other baffle arrangements e.g. a herringbone arrangement, could be provided.

The device 10 also includes a group of nodules 60, 62, 64 and 66 protruding from the sleeve 18 at a level between the baffle 48 and the locating formations 44. The nodules are spaced apart circumferentially, and an identical group of nodules is provided on the opposite side of the sleeve 18 such that the nodules 60 of the groups are diametrically opposed, the nodules 62 diametrically opposed, etc. Typically, the nodules 60, 62 may be of the same size, e.g. about 4 mm in diameter, and the nodules 64, 66 may be of the same size, e.g. about 6 mm in diameter. In use, one or more of the nodules 60, 62, 64, 66 will be cut off, depending on the size of the pool, to permit water to enter into the space 42. Thus, for a small sized swimming pool, only the nodules 60 can be detached, e.g. severed or cut, thereby providing primary apertures through which the water can pass. In a larger pool, for example, the nodules 60 and 62 can be detached. In a very large pool, all the nodules can be detached. If desired, markings (not shown) indicating the nodules and combinations of nodules to be detached for different sized swimming pools, can be provided on the outer surface of the sleeve 18. It is to be appreciated that the nodules need not be circumferentially spaced, e.g. they could be spaced longitudinally or a combination of both longitudinally and circumferentially.

The device 10 also includes a further nodule 68, in proximity to the junction of the sleeve 18 with the sleeve 14. Typically, the diameter of the nodule 68 is 4-5 mm. In use the nodule 68 will also be severed, so that water can also enter the space 42 via the aperture thus formed. However, it is to be understood that the size and location of the nodule 68 will be matched to the dimensions of the sleeves 14, 18 and 32, the number and size of the tablets 38, and the general buoyancy of the device 10. While there are still tablets present within the sleeve 32, the device 10 will float in water in an upright condition with the water being at about the level of the connecting piece 20. However, when all the tablets have been used up, water will flow into the chamber 24, particularly via the aperture formed by the removal of the nodule 68, thereby causing the device 10 to tilt and providing an indication that it is no longer functioning to release chlorine. Hence, the aperture formed when the nodule 68 is removed serves as signaling means for signaling when the tablets have been used up.

To manufacture the device 10, the body 12 can be moulded as a unitary moulding, e.g. by blow-moulding. The sleeve 32 and its end piece 34 can also be moulded as an integral moulding, e.g. by blow-moulding. Thereafter the tablets 38 are inserted into the sleeve 32, and the grid 36 located in position, thereby to trap the tablets 38 within the sleeve 32. The cartridge thus formed is inserted into the operatively lower end of the sleeve 18 until the locating formations 44, 46 engage. Thereafter the end piece 22 is located in position so that the lower end 35 of the sleeve 32 abuts against the skirt 23. The cartridge 30 will hence be sandwiched firmly in position between the locating formations 46 and the skirt 23.

A user detaches or severs the nodule 68, as well as one or more of the nodules 60, 62, 64 and 66 depending on the size of his pool. The device 10 is then placed in the pool, and will float upright in the pool, with the water level being at about the level of the connecting piece 20. Water enters the space 42 via the apertures formed by the severance of the nodules of the one group of nodules, flows along the convoluted flow path defined by the baffles 48, 50 and 52, enters the aperture 40, dissolves some of the lowermost tablet 38 so that chlorine is released into the water, exits the sleeve 32 via the aperture 40, again passes through the convoluted flow path in the space 42, and exits via the apertures of the severed nodules of the other group of nodules.

When the tablets have all been consumed the device 10 is removed from the pool and the end piece 22 is removed permitting the cartridge 30 to be removed from the sleeve 18 and a fresh cartridge to be inserted into the sleeve 18. The end piece 22 is then replaced in position and the device 10 is replaced in the pool. Instead, the entire device 10 could be replaced with a fresh device 10 when the tablets have been consumed.

The Applicant believes that the device 10 provides an easy and effective means of accurately maintaining adequate chlorine levels in swimming pool water for a desired period of time, e.g. 1 month, even when use is made of relatively rapidly dissolving substances such as calcium hypochlorite. Furthermore, solid residue or sediment from the tablets is trapped within the device, thereby avoiding deposition thereof on the pool floor and resultant increase in the water solids content and alkalinity leach. Accurate chlorine dosage results from, inter alia, the quiescent conditions prevailing inside the space 42 and the cartridge 30.

What is claimed is:

1. A water treatment device which includes:
a buoyant body having a hollow bulbous portion, a chamber-defining portion defining an enclosed chamber and protruding down from the bulbous portion such that the inside of the bulbous portion is in communication with the chamber, as well as at least one primary aperture in the chamber-defining portion and arranged such that, when the body floats in water, water can pass through the primary aperture into the chamber, and vice versa;
a holder within the chamber, the holder defining a water treatment substance holding zone for holding a water soluble water treatment substance, and being spaced from the chamber-defining portion of the body such that water can pass along the space between the chamber-defining portion of the body and the holder; and at least one secondary aperture in the holder such that water can pass from the space between the chamber-defining portion of the body and the holder, into the holder via the secondary aperture, and vice versa.

2. A water treatment device as claimed in claim 1, in which the bulbous portion comprises a relatively large diameter cylindrical sleeve ("the large sleeve") and an end piece ("the first end piece") closing off one end of the sleeve, with the chamber-defining portion comprising a smaller diameter cylindrical sleeve ("the small sleeve") connected to the other end of the large sleeve by means of an annular connecting portion, and the free end of the small sleeve also being closed off with an end piece ("the second-end piece").

3. A water treatment device as claimed in claim 2, in which the holder comprises an inner sleeve, an end piece closing off the operatively upper end of the inner sleeve, and water treatment substance support means in proximity to its other end, with the inner sleeve arranged such that its free end is closed off to prevent water from entering the operatively lower end of the inner sleeve.

4. A water treatment device as claimed in claim 3, which includes a water treatment substance within the holder, with the holder and water treatment substance together constituting a cartridge for the device.

5. A water treatment device as claimed in claim 4, in which the substance is in the form of tablets, with the tablets being located one above the other on the support means.

6. A water treatment device as claimed in claim 5, in which the secondary aperture is located at about the level of the tablet resting on the support means.

7. A water treatment device as claimed in claim 6, in which a plurality of diametrically opposed groups of said primary apertures are provided, each group comprising a plurality of primary apertures with at least one of the apertures in each group being of a different size to the other apertures.

8. A water treatment device as claimed in claim 7, in which the primary apertures are covered by nipples protruding from the small sleeve.

9. A water treatment device as claimed in claim 7, in which the total primary aperture area is less than the total secondary aperture area.

10. A water treatment device as claimed in claim 4, which includes signalling means for signalling when the water treatment substance has been consumed.

11. A water treatment device as claimed in claim 10, in which the signalling means includes at least one tertiary aperture in the small sleeve, in proximity to its junction with the annular connecting portion, the size and location of the tertiary aperture being such that when all of the water treatment substance has been consumed, water enters the large sleeve causing the device to tilt at an angle.

12. A water treatment device as claimed in claim 11, in which the small sleeve is provided with cartridge locating means, with complementary cartridge locating means being provided on the inner sleeve so that when the locating means engage each other, the operatively lower end of the inner sleeve fits snugly against the second end piece to close off the lower end of the inner sleeve.

13. A water treatment device as claimed in claim 12, in which at least one water baffle is positioned in the space between the inner sleeve and the small sleeve.

14. A water treatment device as claimed in claim 4 in which the support means is adapted to support the water treatment substance with clearance from the operatively lower end of the inner sleeve, such that insoluble matter in the water treatment substance can pass to the operatively lower end of the inner sleeve.

15. A water treatment device, which includes
an outer sleeve defining an enclosed chamber, with at least one primary aperture in the sleeve arranged such that when the outer sleeve floats in water, water can enter and leave the chamber through the primary aperture;

an inner sleeve contained wholly within the chamber, the inner sleeve defining a water treatment substance holding zone for holding a water soluble water treatment substance, and being spaced from the outer sleeve such that water can pass along the space between the outer and inner sleeves;

at least one secondary aperture in the inner sleeve such that water can pass from the space between the sleeves, into the inner sleeve via the secondary aperture, and vice versa; and buoyancy means adapted to render the device buoyant in water.

16. A water treatment device as claimed in claim 15, in which the buoyancy means is integral with the outer sleeve.

17. A water treatment device as claimed in claim 15, in which the buoyancy means is of annular form, with the outer sleeve being releasably mountable thereto.

18. A water treatment device which includes:
a buoyant body having a chamber-defining portion defining an enclosed chamber, as well as at least one primary aperture in the chamber-defining portion and arranged such that, when the body floats in water, water can pass through the primary aperture into the chamber, and vice versa;

a holder contained wholly within the chamber, the holder defining a water treatment substance holding zone for holding a water soluble water treatment substance, and being spaced from the chamber-defining portion of the body such that water can pass along the space between the chamber-defining portion of the body and the holder; and at least one secondary aperture in the holder such that water can pass from the space between the chamber-defining portion of the body and the holder, into the holder via the secondary aperture, and vice versa.

19. A water treatment device as claimed in claim 18 in which the body comprises a hollow bulbous portion, with the chamber-defining portion protruding down from the bulbous portion such that the inside of the bulbous portion is in communication with the chamber.

20. A water treatment device as claimed in claim 18, which includes a water treatment substance within the holder, with the holder and water treatment substance together constituting a cartridge for the device.

* * * * *